(12) United States Patent
Kienzle et al.

(10) Patent No.: US 9,219,655 B1
(45) Date of Patent: Dec. 22, 2015

(54) SYSTEMS AND METHODS FOR DISCOVERING NETWORK TOPOLOGIES

(71) Applicants: Darrell Kienzle, Vienna, VA (US);
Nathan Evans, Sterling, VA (US);
Matthew Elder, Germantown, MD (US)

(72) Inventors: Darrell Kienzle, Vienna, VA (US);
Nathan Evans, Sterling, VA (US);
Matthew Elder, Germantown, MD (US)

(73) Assignee: Symantec Corporation, Mountain View, CA (US)

( * ) Notice: Subject to any disclaimer, the term of this patent is extended or adjusted under 35 U.S.C. 154(b) by 457 days.

(21) Appl. No.: 13/660,574

(22) Filed: Oct. 25, 2012

(51) Int. Cl.
*H04L 12/24* (2006.01)

(52) U.S. Cl.
CPC .................................. *H04L 41/12* (2013.01)

(58) Field of Classification Search
CPC ........................................................ H04L 41/12
USPC ................................................. 370/254–256
See application file for complete search history.

(56) References Cited

U.S. PATENT DOCUMENTS

| | | | | |
|---|---|---|---|---|
| 6,795,403 | B1 * | 9/2004 | Gundavelli | 370/256 |
| 6,898,189 | B1 * | 5/2005 | Di Benedetto et al. | 370/256 |
| 2004/0081171 | A1 * | 4/2004 | Finn | 370/395.53 |
| 2013/0148547 | A1 * | 6/2013 | Page et al. | 370/255 |

OTHER PUBLICATIONS

Linkd; The OpenNMS Project; http://www.opennms.org/wiki/Linkd; As accessed on Aug. 24, 2012.
Sergio R. Rodriguez; Topology Discovery Using Cisco Discovery Protocol; University of New South Wales; As accessed on Aug. 24, 2012.
Anders Fosgerau; Layer 2 Topology Discovery; Technical University of Denmark; As accessed on Aug. 24, 2012.
David T. Stott; Layer-2 Path Discovery Using Spanning Tree MIBs; Avaya Labs Research; As accessed on Aug. 24, 2012.
Zhang Shibo; Improved Algorithm for network Topology Discovery Based on STP; Beijing Institute of Petrochemical Technology; As accessed on Aug. 24, 2012.
Yide Wang et al.; Research and Application on Automatic network Topology Discovery in ITSM System; Software College Northeastern University; As accessed on Aug. 24, 2012.
Darrell Kienzle et al.; Systems and Methods for Mapping Network Topologies; U.S. Appl. No. 13/043,038, filed Mar. 8, 2011.
William Gauvin, et al; Detecting Network Devices and Mapping Topology Using Network Introspection by Collaboration Endpoints; U.S. Appl. No. 12/713,606, filed Feb. 26, 2010.

* cited by examiner

*Primary Examiner* — Hassan Kizou
*Assistant Examiner* — Ashil Farahmand
(74) *Attorney, Agent, or Firm* — ALG Intellectual Property, LLC

(57) ABSTRACT

A computer-implemented method for discovering network topologies. The method may include (1) receiving, on a host system within a network, a switch-protocol message that includes a switch identifier, a port identifier, and/or a root path cost, (2) identifying a set of switches within the network based on the switch-protocol message, (3) determining how the set of switches are connected based on the switch-protocol message, and (4) mapping a topology of the network based on determining how the set of switches are connected. Various other methods, systems, and computer-readable media are also disclosed.

16 Claims, 14 Drawing Sheets

500

| Link Data Rate | Link Cost |
|---|---|
| 4 Mbit/s | 5,000,000 |
| 10 Mbit/s | 2,000,000 |
| 16 Mbit/s | 1,250,000 |
| 100 Mbit/s | 200,000 |
| 1 Gbit/s | 20,000 |
| 2 Gbit/s | 10,000 |
| 10 Gbit/s | 2,000 |

*FIG. 5*

SYSTEMS AND METHODS FOR DISCOVERING NETWORK TOPOLOGIES

GOVERNMENT LICENSE RIGHTS

This Invention was made with Government support under FA8750-10-9-0110 awarded by Air Force Research Laboratory/RIKE, Rome Research Site, 26 Electronic Parkway, Rome, N.Y. 13441. The Government has certain rights in the Invention.

BACKGROUND

Consumers and organizations may spend a considerable amount of resources configuring and troubleshooting local area networks (LANs). In many cases, consumers and organizations may wish to discover details about the topology of their LANs in order to more efficiently configure, troubleshoot, and/or maintain their LANs. While the transparent functionality afforded by some networking protocols may simplify the operation of a LAN, it may also make gathering information about the infrastructure on which those protocols operate more difficult. Accordingly, many LANs may exist without configuration information that specifies their topology.

Traditional technologies for discovering the layer-2 topology of LANs may leverage management capabilities of some layer-2 switches. For example, these technologies may use the Simple Network Management Protocol (SNMP) to communicate with layer-2 switches and gather information useful for mapping a topology of a LAN. Unfortunately, these technologies may have several drawbacks. For example, these technologies may require an administrator to have a certain level of knowledge about the topology of a LAN. Furthermore, these technologies may require administrative privileges to access relevant network management data. However, due to organizational division of responsibilities, an administrator requiring network topological information may not have the necessary privileges. Additionally, these technologies may not work at all with unmanaged layer-2 switches.

An alternative approach may attempt to infer information about the layer-2 topology of a LAN by spoofing Media Access Control (MAC) addresses when transmitting frames across the network. Unfortunately, this approach may fail in network environments that implement MAC filtering to prevent spoofing. Accordingly, the instant disclosure identifies a need for additional and improved systems and methods for discovering network topologies.

SUMMARY

As will be described in greater detail below, the instant disclosure generally relates to systems and methods for discovering network topologies. In one example, a computer-implemented method for discovering network topologies may include (1) receiving, on at least one host system within a network, at least one switch-protocol message that includes a switch identifier, a port identifier, and a root path cost, (2) identifying a set of switches within the network based on the switch-protocol message, (3) determining how the set of switches are connected based on the switch-protocol message, and (4) mapping a topology of the network based on determining how the set of switches are connected. In some embodiments, the switch identifier may identify a switch within the network, the port identifier may identify a port of the switch through which the host system can communicate with a root switch of the network, and the root path cost may identify a path cost from the switch to the root switch.

In some embodiments, the step of identifying the set of switches within the network may include (1) identifying at least one additional host system that received an additional switch-protocol message that includes an additional switch identifier that also identifies the switch, (2) determining that the host system and the additional host system are directly connected to a message-originating switch that originated the switch-protocol message and the additional switch-protocol message by determining that the port identifiers of the switch-protocol message and the additional switch-protocol message are different, and (3) adding the message-originating switch to the set of switches within the network.

In one embodiment, the step of identifying the set of switches within the network may include (1) identifying at least one additional host system that received an additional switch-protocol message that includes an additional switch identifier that also identifies the switch, (2) determining that the host system and the additional host system are directly connected to a message-forwarding switch that forwarded the switch-protocol message and the additional switch-protocol message by determining that the port identifiers of the switch-protocol message and the additional switch-protocol message are identical, and (3) adding the message-forwarding switch to the set of switches within the network.

In certain embodiments, the step of determining how the set of switches are connected may include identifying a set of intermediate switches between the switch and the root switch based on the root path cost.

In some embodiments, the step of identifying the set of intermediate switches between the switch and the root switch may include (1) identifying a link cost for each switch within the set of switches and (2) identifying a subset of the set of switches that includes the set of intermediate switches by determining that an aggregate link cost of the subset of the set of switches equals, when summed with the link cost of the switch, the root path cost.

In one embodiment, the step of identifying the link cost for each switch within the set of switches may include broadcasting, from the host system, a switch-protocol message that identifies the host system as the root switch.

In at least one embodiment, the method may further include receiving, on at least one additional host system, an additional switch-protocol message that identifies the host system as the root switch and that includes the link cost of the switch.

In various embodiments, the step of identifying the set of switches within the network may include identifying, for at least one switch within the set of switches, a set of host systems directly connected to the switch within the set of switches.

In some embodiments, the topology of the network may include the set of switches, how the set of switches are connected, and/or the set of host systems. In certain embodiments, the switch-protocol message may include a spanning tree protocol message. In at least one embodiment, the topology of the network may include a layer 2 network topology.

In one embodiment, a system for implementing the above-described method may include (1) a message-receiving module programmed to receive, on at least one host system within a network, at least one switch-protocol message that includes a switch identifier, a port identifier, and a root path cost, (2) a switch-identification module programmed to identify a set of switches within the network based on the switch-protocol message, (3) a connection-determining module programmed to determine how the set of switches are connected based on the switch-protocol message, (4) a topology-mapping module programmed to map a topology of the network based on determining how the set of switches are connected, and (5) at least one processor configured to execute the message-receiving module, the switch-identification module, the connection-determining module, and the topology-mapping module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive, on at least one host system within a network, at least one switch-protocol message that includes a switch identifier, a port identifier, and a root path cost, (2) identify a set of switches within the network based on the switch-protocol message, (3) determine how the set of switches are connected based on the switch-protocol message, and (4) map a topology of the network based on determining how the set of switches are connected.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of exemplary link costs.

Figure 1:
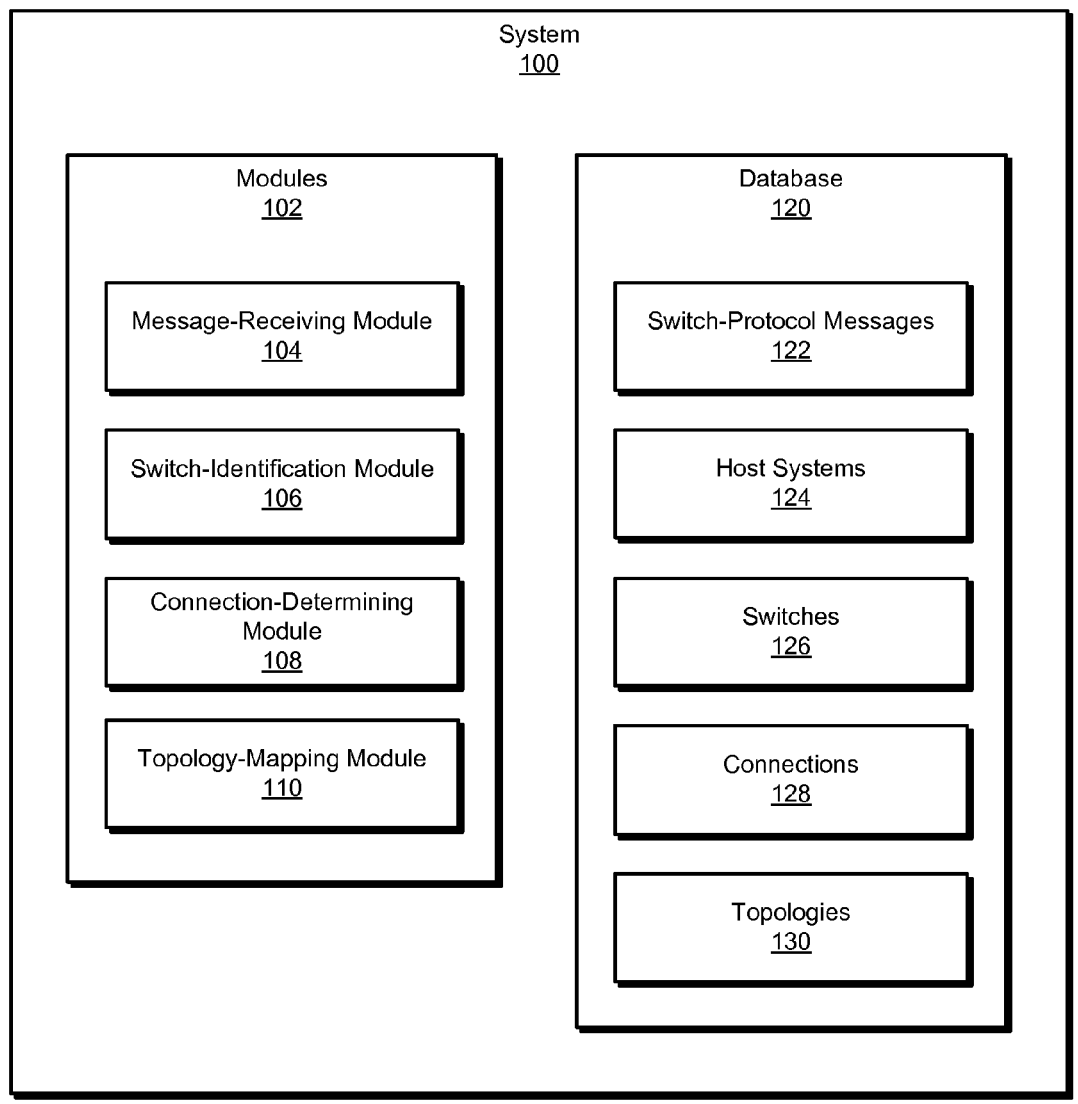
FIG. 1 is a block diagram of an exemplary system for discovering network topologies.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for discovering network topologies. As will be explained in greater detail below, by correlating switch-protocol messages received on host systems within networks, the systems and methods described herein may discover network topologies. Furthermore, in some examples, by mapping network topologies through the collection of switch-protocol messages that are broadcast by switches within networks, these systems and methods may gather topological information about networks without relying on management protocols or MAC address spoofing. These systems and methods may therefore successfully map networks with unmanaged switches and/or with MAC filtering.

Figure 2:
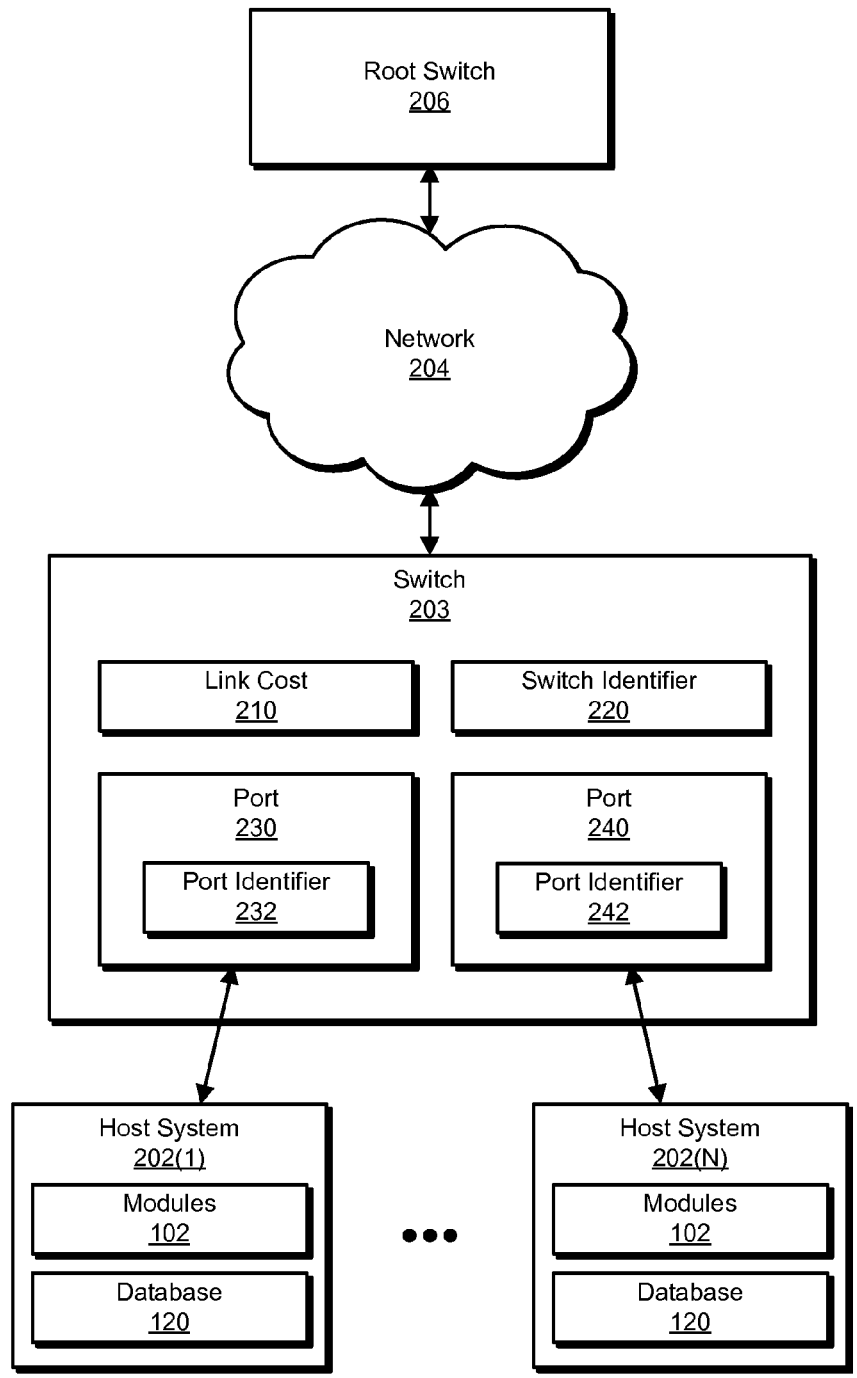
FIG. 2 is a block diagram of an exemplary system for discovering network topologies.

The following will provide, with reference to FIGS. 1-2, detailed descriptions of exemplary systems for discovering network topologies. Detailed descriptions of corresponding computer-implemented methods will also be provided in connection with FIG. 3. Detailed descriptions of an exemplary network will be provided in connection with FIGS. 4-12. In addition, detailed descriptions of an exemplary computing system and network architecture capable of implementing one or more of the embodiments described herein will be provided in connection with FIGS. 13 and 14, respectively.

FIG. 1 is a block diagram of an exemplary system 100 for discovering network topologies. As illustrated in this figure, exemplary system 100 may include one or more modules 102 for performing one or more tasks. For example, and as will be explained in greater detail below, exemplary system 100 may include a message-receiving module 104 programmed to receive, on at least one host system within a network, at least one switch-protocol message that includes a switch identifier, a port identifier, and a root path cost. Exemplary system 100 may also include a switch-identification module 106 programmed to identify a set of switches within the network based on the switch-protocol message.

In addition, and as will be described in greater detail below, exemplary system 100 may include a connection-determining module 108 programmed to determine how the set of switches are connected based on the switch-protocol message. Exemplary system 100 may also include a topology-mapping module 110 programmed to map a topology of the network based on determining how the set of switches are connected. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., host systems 202(1)-(N)), the devices illustrated in FIG. 6 (e.g., hosts 612, 614, 622, 624, 626, 632, 634, 636, 642, 644, 652, and 654), computing system 1310 in FIG. 13, and/or portions of exemplary network architecture 1400 in FIG. 14. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include switch-protocol messages 122 for storing information about one or more switch-protocol messages, host systems 124 for storing information about one or more host systems, switches 126 for storing information about one or more switches, connections 128 for storing information about how switches 126 are connected, and topologies 130 for storing information about one or more network topologies.

Database 120 may represent portions of a single database or computing device or a plurality of databases or computing devices. For example, database 120 may represent a portion of host systems 202(1)-(N) in FIG. 2, hosts 612, 614, 622, 624, 626, 632, 634, 636, 642, 644, 652, and 654 in FIG. 6, computing system 1310 in FIG. 13, and/or portions of exemplary network architecture 1400 in FIG. 14. Alternatively, database 120 in FIG. 1 may represent one or more physically separate devices capable of being accessed by a computing device, such as one or more of host systems 202(1)-(N) in FIG. 2, one or more of hosts 612, 614, 622, 624, 626, 632, 634, 636, 642, 644, 652, and 654 in FIG. 6, computing system 1310 in FIG. 13, and/or portions of exemplary network architecture 1400 in FIG. 14.

Exemplary system 100 in FIG. 1 may be implemented in a variety of ways. For example, all or a portion of exemplary system 100 may represent portions of exemplary system 200 in FIG. 2. As shown in FIG. 2, system 200 may include host systems 202(1)-(N), a switch 203, and a root switch 206 connected via a network 204. Host systems 202(1)-(N) may be programmed with one or more of modules 102 and/or may store all or a portion of the data in database 120. Additionally or alternatively, a server accessible to host systems 202(1)-(N) may be programmed with one or more of modules 102 and/or may store all or a portion of the data in database 120.

In one embodiment, one or more of modules 102 from FIG. 1 may, when executed by at least one processor of host systems 202(1)-(N), facilitate host systems 202(1)-(N) in discovering network topologies. For example, and as will be described in greater detail below, one or more of modules 102 may cause host systems 202(1)-(N) to discover the topology of network 204 by (1) receiving at least one switch-protocol message that includes a switch identifier (e.g., switch identifier 220), a port identifier (e.g., port identifiers 232 or 242) and a root path cost (e.g., a root path cost that includes link cost 210), (2) identifying a set of switches (e.g., switch 203 and root switch 206) within the network based on the switch-protocol message, (3) determining how the set of switches are connected based on the switch-protocol message, and (4) mapping a topology of the network based on determining how the set of switches are connected.

Host systems 202(1)-(N) generally represent any type or form of computing device capable of reading computer-executable instructions. Examples of host systems 202(1)-(N) include, without limitation, laptops, tablets, desktops, servers, cellular phones, Personal Digital Assistants (PDAs), multimedia players, embedded systems, combinations of one or more of the same, exemplary computing system 1310 in FIG. 13, or any other suitable computing device. In at least one example, host system 202(1) may (1) gather topological information (e.g., switch-protocol messages received on host systems 202(2)-(N)) from one or more of host systems 202(2)-(N) and (2) map a topology of network 204 using the gathered topological information. Additionally and/or alternatively, a server may (1) gather topological information (e.g., switch-protocol messages received on host systems 202(1)-(N)) from one or more of host systems 202(1)-(N) and (2) map a topology of network 204 using the gathered topological information.

Switch 203 and root switch 206 generally represent any type or form of device that connects and/or passes data between network segments and/or network devices (e.g., host systems 202(1)-(N)) within a network. Examples of switch 203 and root switch 206 include, without limitation, layer-2 network switches and/or bridges. As will be explained in greater detail below, switch 203 and root switch 206 may be configured to periodically broadcast switch-protocol messages. In at least one example, switch 203 and/or root switch 206 may represent a switch capable of implementing the Spanning Tree Protocol (STP).

As shown in FIG. 2, switch 203 may include a link cost 210, a switch identifier 220, and two or more ports (e.g., ports 230 and 240) each associated with a port identifier (e.g., port identifiers 232 and 242). Link cost 210 may represent a cost of transferring data through switch 203. For example, link cost 210 may represent a data rate of switch 203. In another example, link cost 210 may represent an arbitrary link cost assigned to switch 203 by an administrator. Switch identifier 220 may represent a value (e.g., a MAC address) that uniquely identifies switch 203. Ports 230 and 240 generally represent an interface (e.g., an Ethernet port) through which network segments and/or network devices may be connected to switch 203. As shown in FIG. 2, a port may be associated with a port identifier (e.g., port identifiers 232 and 242) that represents a value that uniquely identifies the port.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1400 in FIG. 14, or the like. Network 204 may facilitate communication or data transfer using wireless or wired connections. In one embodiment, network 204 may facilitate communication between host systems 202(1)-(N), switch 203, and/or root switch 206.

Figure 3:
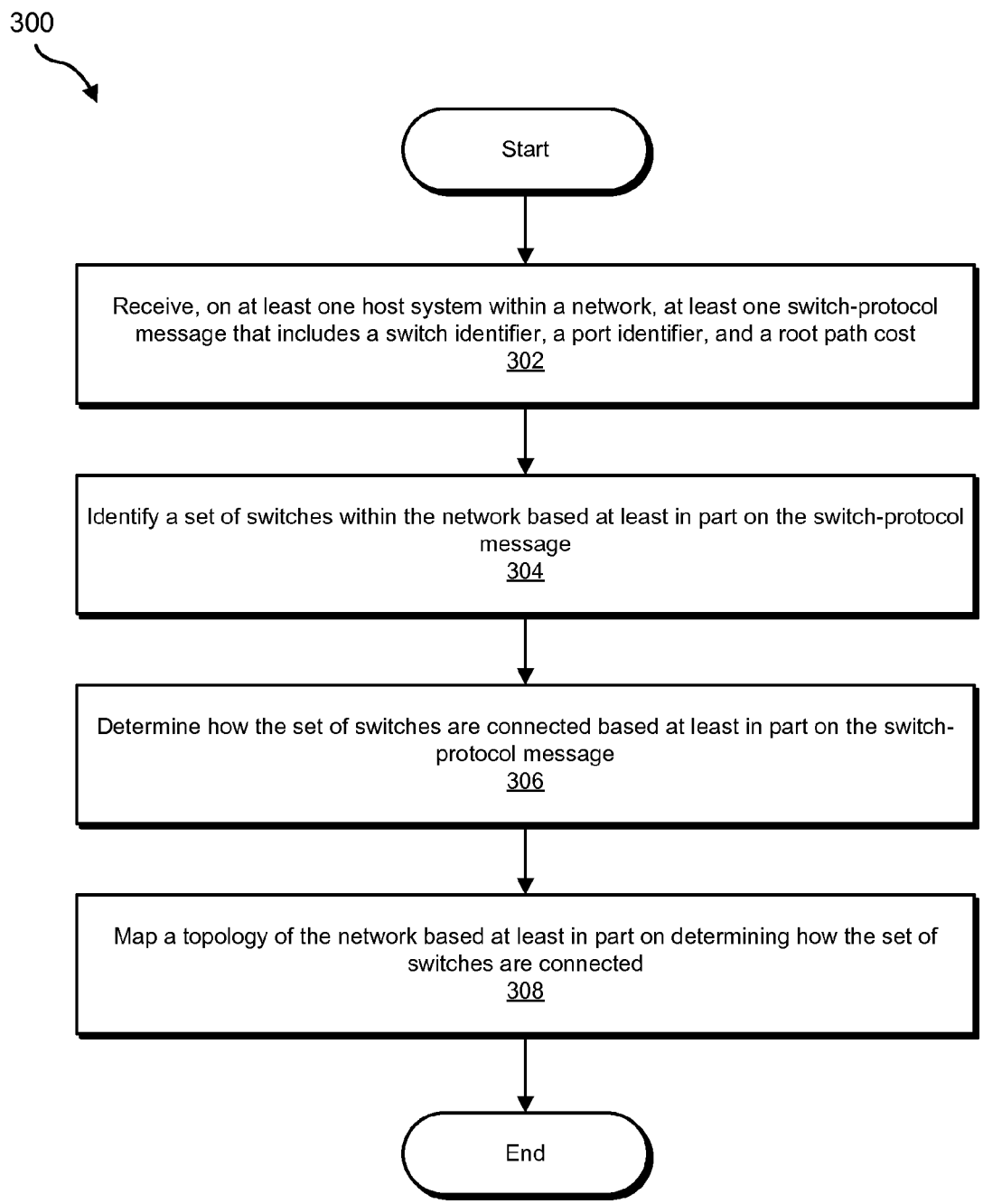
FIG. 3 is a flow diagram of an exemplary method for discovering network topologies.

FIG. 3 is a flow diagram of an exemplary computer-implemented method 300 for discovering network topologies. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, hosts 612, 614, 622, 624, 626, 632, 634, 636, 642, 644, 652, and 654 in FIG. 6, computing system 1310 in FIG. 13, and/or portions of exemplary network architecture 1400 in FIG. 14.

At step 302, one or more of the systems described herein may receive, on at least one host system within a network, at least one switch-protocol message that includes a switch identifier, a port identifier, and a root path cost. For example at step 302, message-receiving module 104 may, as part of host system 202(1) in FIG. 2, receive a switch-protocol message from switch 203.

Figure 4:
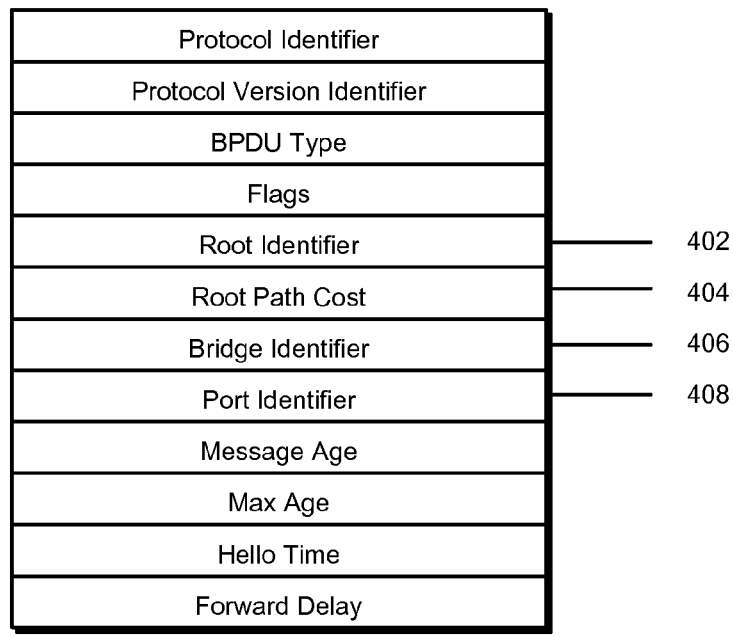
FIG. 4 is a block diagram of an exemplary switch-protocol message.

As used herein, the term "switch-protocol message" may generally refer to any message that is transmitted within a network that includes a switch identifier, a port identifier, and a root path cost. Examples of switch-protocol messages may include, without limitation, Spanning Tree Protocol (STP) messages. FIG. 4 is a diagram of an exemplary switch-protocol message 400. In one example, switch-protocol message 400 may represent a Bridge Protocol Data Unit (BPDU). As shown in FIG. 4, switch-protocol message 400 may include a root identifier 402, a root path cost 404, a bridge identifier 406, and a port identifier 408.

Root identifier 402 and/or bridge identifier 406 may represent switch identifiers. In some examples, a switch identifier in a switch-protocol message may uniquely identify a switch within a network. For example, a switch identifier may include a MAC address of a switch. In one example, root identifier 402 of switch-protocol message 400 may include a MAC address that uniquely identifies a root switch of a network, and bridge identifier 406 may include a MAC address that uniquely identifies a switch within the network that originated switch-protocol message 400.

Port identifier 408 may represent a port identifier. In some examples, a port identifier in a switch-protocol message may uniquely identify a port of a switch within a network. For example, a port identifier may uniquely identify a port of a switch through which a switch-protocol message was transmitted. In one example, port identifier 408 of switch-protocol message 400 may uniquely identify a port of a switch (e.g., the switch identified by bridge identifier 406) through which switch-protocol message 400 was transmitted and/or through which a host system can communicate with a root switch (e.g., the switch identified by root identifier 402).

Root path cost 404 may represent a root path cost. In one example, a root path cost in a switch-protocol message may identify a path cost from a switch in a tree network to the root switch of the tree network. In at least one example, a root path cost may be determined by summing the link costs of each switch along the path from the switch to the root switch. In certain examples, a network protocol may use standardized link cost values. FIG. 5 is a diagram of exemplary link costs 500. Link costs 500 illustrates an exemplary set of default link costs that are based on switch data rates. For example as shown, a switch with a data rate of 4 Mbit/s may have a default link cost of 5,000,000, while a switch with a link cost of 2,000 may have a data rate of 10 Gbit/s. Additionally and/or alternatively, a link cost of a switch may represent an arbitrary link cost assigned to a switch by an administrator.

Figure 6:
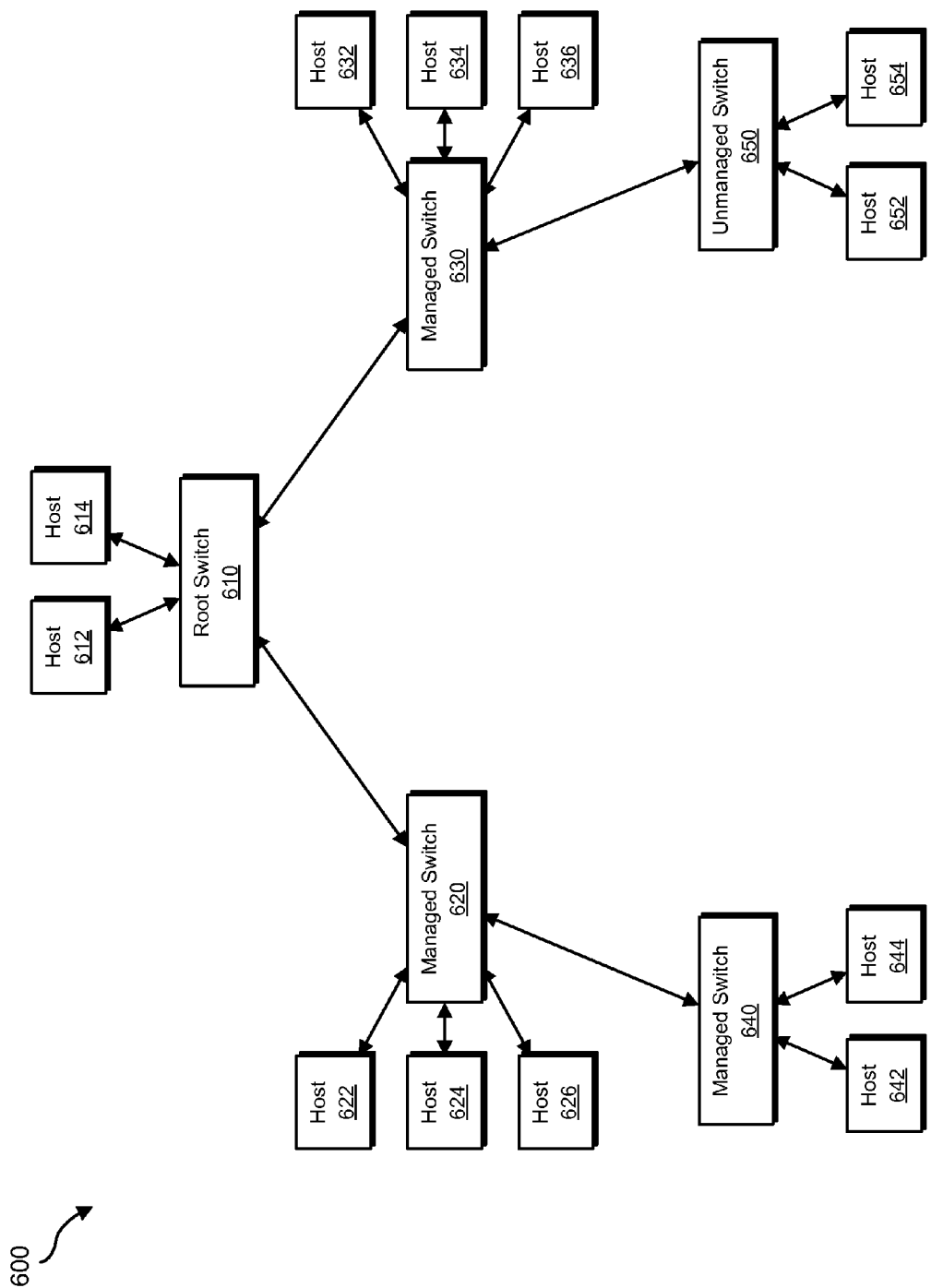
FIG. 6 is a block diagram of an exemplary network.

In some examples, switch-protocol messages (e.g., like switch-protocol message 400) may be exchanged by switches within a network as part of a network protocol. FIG. 6 is a block diagram of an exemplary network 600. Network 600 may represent a network that has been organized as a tree network according to a network protocol (e.g., the Spanning Tree Protocol (STP)). As shown, network 600 may include a root switch 610, a managed switch 620, a managed switch 630, a managed switch 640, and an unmanaged switch 650. In this example, root switch 610 and managed switches 620, 630, and 640 may represent message-originating switches (e.g., switches that create and transmit switch-protocol messages according to a network protocol), while unmanaged switch 650 may represent a message-forwarding switch (e.g., a switch that receives and forwards switch-protocol messages). As shown, network 600 may also include a plurality of host systems (e.g., hosts 612, 614, 622, 624, 626, 632, 634, 636, 642, 644, 652, and 654).

Figure 7:
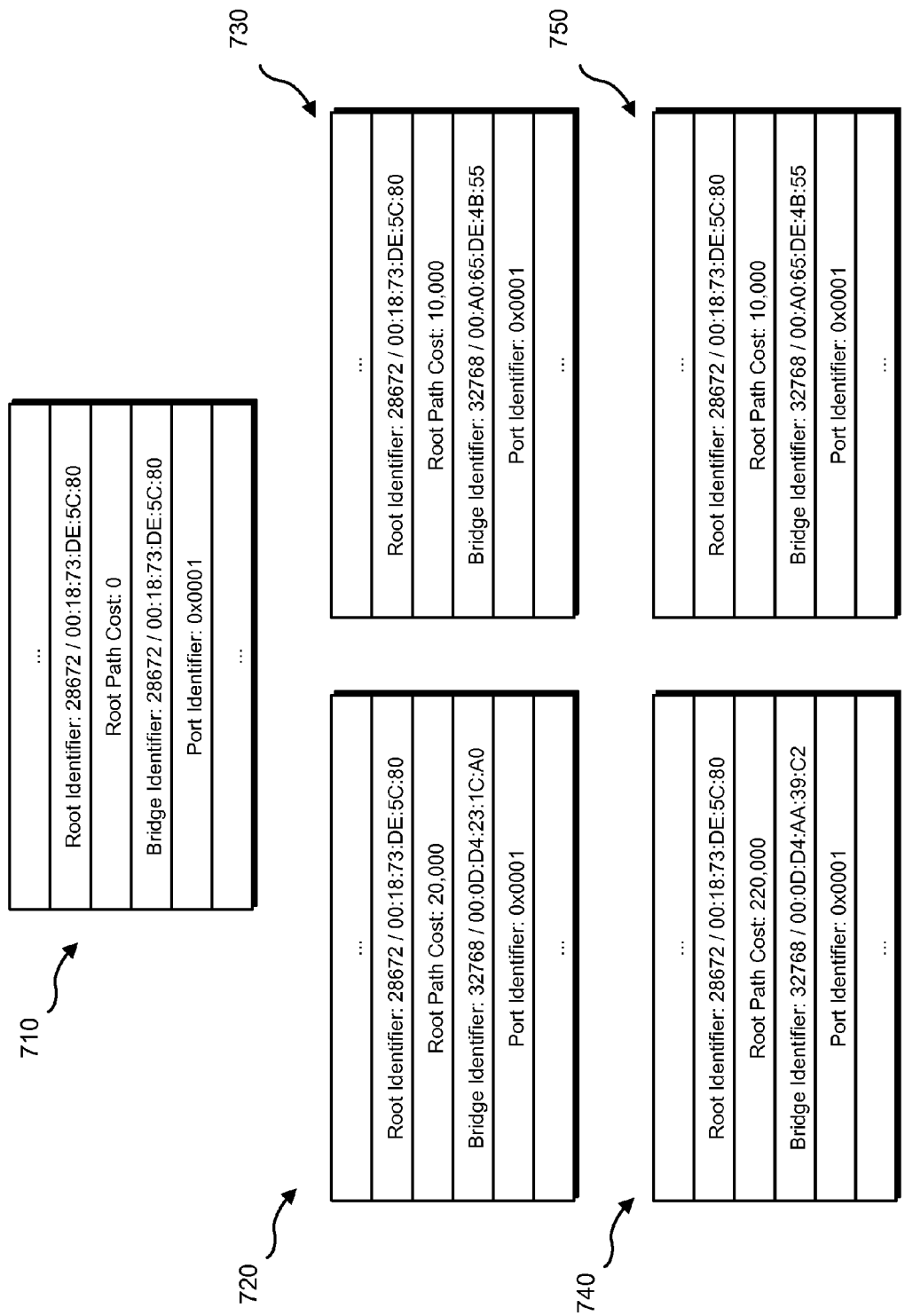
FIG. 7 is a block diagram of an exemplary switch-protocol messages.

In one example, root switch 610, managed switch 620, managed switch 630, and managed switch 640 may be configured to periodically create and broadcast switch-protocol messages (e.g., switch-protocol messages 710-750 in FIG. 7).

FIG. 7 is a block diagram of exemplary switch-protocol messages. FIG. 7 illustrates switch-protocol messages that may be broadcast within network 600. For example, root switch 610 may periodically create and broadcast via its ports a switch-protocol message that identifies root switch 610 as the root switch of network 600. For example, root switch 610 may periodically create and transmit switch-protocol message 710 (e.g., to one of managed switch 620, managed switch 630, host 612, or host 614). As shown in FIG. 7, switch-protocol message 710 may include a root identifier (e.g., 28672/00:18:73:DE:5C:80) that uniquely identifies root switch 610, a root path cost (e.g., 0) that represents the path cost to root switch 610, a bridge identifier (e.g., 28672/00:18:73:DE:5C:80) that identifies root switch 610 as the originating switch of switch-protocol message 710, and a port identifier (e.g., 0x0001) that identifies the port of root switch 610 through which switch-protocol message 710 was transmitted.

Message-originating switches may be configured to create and transmit switch-protocol messages in response to receiving switch-protocol messages. For example, in response to receiving switch-protocol message 710 from root switch 610, managed switch 620 may create and transmit via at least one of its ports a switch-protocol message based on the information contained within switch-protocol message 710. For example, managed switch 620 may create and transmit switch-protocol message 720 (e.g., to one of managed switch 640, host 622, host 624, or host 626). As shown in FIG. 7, switch-protocol message 720 may include a root identifier (e.g., 28672/00:18:73:DE:5C:80) that uniquely identifies root switch 610, a root path cost (e.g., 20,000) that represents the path cost from managed switch 620 to root switch 610 (in this case, the root path cost identified in switch-protocol message 710 plus the link cost of managed switch 620), a bridge identifier (e.g., 32768/00:0D:D4:23:1C:A0) that identifies managed switch 620 as the originating switch of switch-protocol message 720, and a port identifier (e.g., 0x0001) that identifies the port of managed switch 620 through which switch-protocol message 720 was transmitted.

In response to receiving switch-protocol message 710 from root switch 610, managed switch 630 may create and transmit via at least one of its ports a switch-protocol message based on the information contained within switch-protocol message 710. For example, managed switch 630 may create and transmit switch-protocol message 730 (e.g., to one of unmanaged switch 650, host 632, host 634, or host 636). As shown in FIG. 7, switch-protocol message 730 may include a root identifier (e.g., 28672/00:18:73:DE:5C:80) that uniquely identifies root switch 610, a root path cost (e.g., 10,000) that represents the path cost from managed switch 630 to root switch 610 (in this case, the root path cost identified in switch-protocol message 710 plus the link cost of managed switch 630), a bridge identifier (e.g., 32768/00:A0:65:DE:4B:55) that identifies managed switch 630 as the originating switch of switch-protocol message 730, and a port identifier (e.g., 0x0001) that identifies the port of managed switch 630 through which switch-protocol message 730 was transmitted.

In response to receiving switch-protocol message 720 from managed switch 620, managed switch 640 may create and transmit via at least one of its ports a switch-protocol message based on the information contained within switch-protocol message 720. For example, managed switch 640 may create and transmit switch-protocol message 740 (e.g., to one of host 642 or host 644). As shown in FIG. 7, switch-protocol message 740 may include a root identifier (e.g., 28672/00:18:73:DE:5C:80) that uniquely identifies root switch 610, a root path cost (e.g., 220,000) that represents the path cost from managed switch 640 to root switch 610 (in this case, the root path cost identified in switch-protocol message 720 plus the link cost of managed switch 640), a bridge identifier (e.g., 32768/00:0D:D4:AA:39:C2) that identifies managed switch 640 as the originating switch of switch-protocol message 740, and a port identifier (e.g., 0x0001) that identifies the port of managed switch 640 through which switch-protocol message 740 was transmitted.

Unlike a message-originating switch, a message-forwarding switch may simply forward a switch-protocol message in response to receiving the switch-protocol message. For example, in response to receiving switch-protocol message 750 from managed switch 630, unmanaged switch 650 may simply forward switch-protocol message 750 to host 452 and/or host 454. As shown in FIG. 7, switch-protocol message 750 may include a root identifier (e.g., 28672/00:18:73:DE:5C:80) that uniquely identifies root switch 610, a root path cost (e.g., 10,000) that represents the path cost from managed switch 630 to root switch 610 (in this case the link cost of managed switch 630), a bridge identifier (e.g., 32768/00:A0:65:DE:4B:55) that identifies managed switch 630 as the originating switch of switch-protocol message 750, and a port identifier (e.g., 0x0001) that identifies the port of managed switch 630 through which switch-protocol message 750 was transmitted to unmanaged switch 650.

Returning to FIG. 3, the systems described herein may perform step 302 in any suitable manner. In one example, message-receiving module 104 may be configured to run on one or more host systems within a network. For example, one or more host systems may be configured to host an agent that includes message-receiving module 104. Message-receiving module 104 may, as part of a host system, listen for and collect switch-protocol messages that are received on the host system. Upon receiving a switch-protocol message, message-receiving module 104 may store the switch-protocol message to switch-protocol messages 122.

In addition, message-receiving module 104 may, as part of the host system, identify the host system within the network (e.g., by determining an Internet Protocol address of the host system and/or by determining a MAC address of the host system) and may store the identity of the host system to host systems 124. Message-receiving module 104 may also associate the host system with each switch-protocol message received on the host system.

Using FIG. 6 as an example, each host within network 600 may be configured to host an agent that includes message-receiving module 104. In this example, message-receiving module 104 may, as part of each host within network 600, identify each host and/or collect switch-protocol messages received on each host. For example, message-receiving module 104 may identify each of hosts 612, 614, 622, 624, 626, 632, 634, 636, 642, 644, 652, and 654 and collect switch-protocol messages received on hosts 612, 614, 622, 624, 626, 632, 634, 636, 642, 644, 652, and 654.

Again using switch-protocol messages 710-750 in FIG. 7 as examples, message-receiving module 104 may, as part of host 612 or host 614, receive switch-protocol message 710, message-receiving module 104 may, as part of host 622, host 624, or host 626, receive switch-protocol message 720, message-receiving module 104 may, as part of host 632, host 634, or host 636, receive switch-protocol message 730, message-receiving module 104 may, as part of host 642 or host 644, receive switch-protocol message 740, and message-receiving module 104 may, as part of host 652 or host 654, receive switch-protocol message 750 in FIG. 7.

Figure 8:
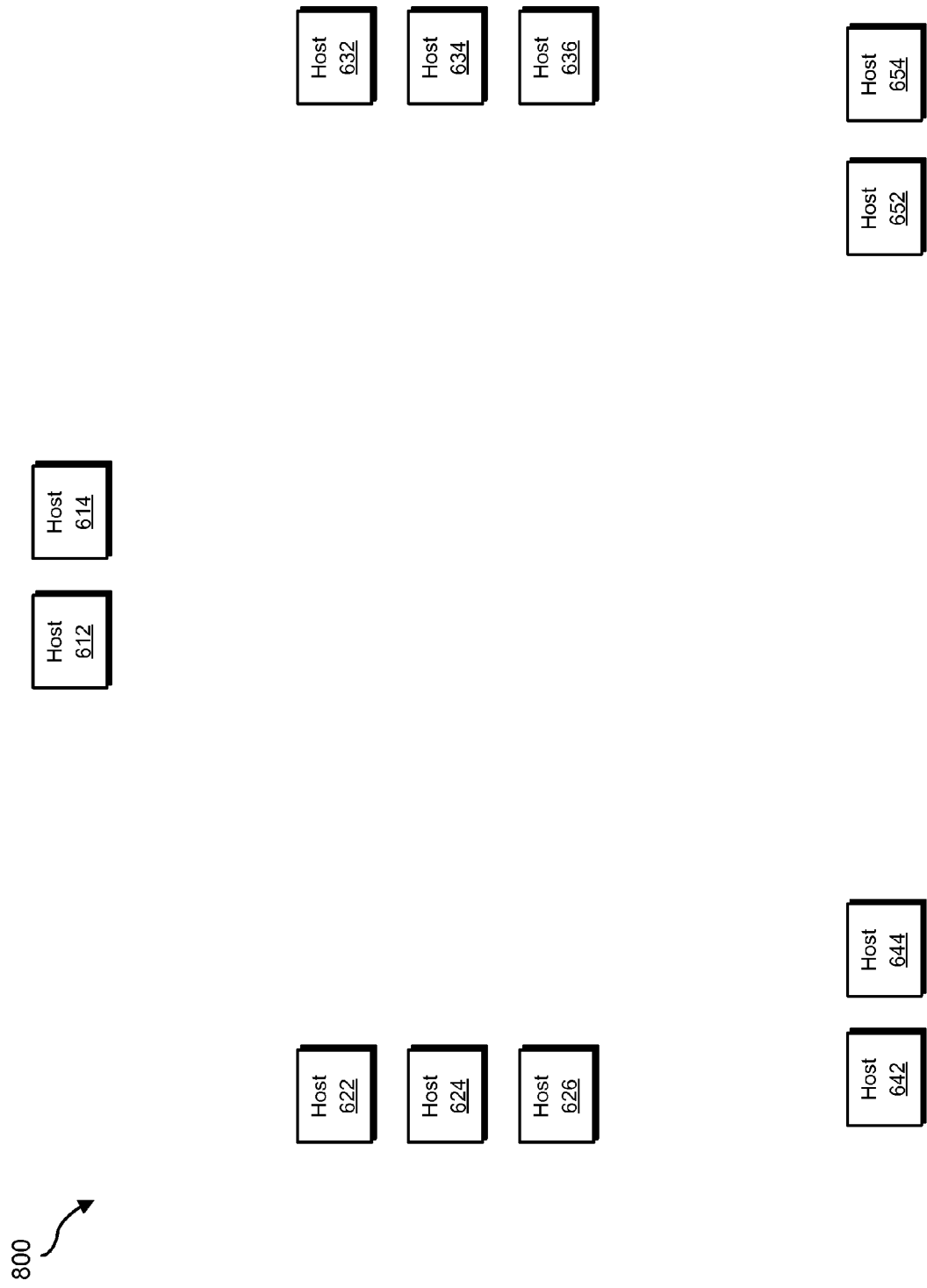
FIG. 8 is a block diagram of an exemplary network map.

FIG. 8 is a block diagram of an exemplary network map 800 of network 600. FIG. 8 illustrates what the systems described herein may know about network 600 after message-receiving module 104 has identified hosts 612, 614, 622, 624, 626, 632, 634, 636, 642, 644, 652, and 654. Accordingly, network map 800 may represent an initial map of the topology of network 600.

Returning to FIG. 3 at step 304, one or more of the systems described herein may identify a set of switches within the network based at least in part on the switch-protocol message. For example, at step 304 switch-identification module 106 may, as part of host systems 202(1)-(N) in FIG. 2, identify switch 203 and root switch 206 using the switch-protocol messages received as part of step 302.

The systems described herein may perform step 304 in any suitable manner. In one example, switch-identification module 106 may identify switches by examining switch identifiers contained within switch-protocol messages. For example as mentioned above, each unique switch identifier contained within a switch-protocol message may represent a switch within a network. Again using switch-protocol messages 710-750 in FIG. 7 as examples, switch-identification module 106 may identify root switch 610 and managed switches 620, 630, and 640 by identifying their respective switch identifiers within the root identifier and bridge identifier fields of switch-protocol messages 710-750.

Additionally and/or alternatively, switch-identification module 106 may identify a switch within a network by determining that a group of host systems within the network is connected to the switch. As mentioned above, a message-originating switch may transmit a switch-protocol message in a way that uniquely identifies the message-originating switch and the port of the message-originating switch through which the switch-protocol message is transmitted. For this reason, if a switch identifier (e.g., a bridge identifier) and a port identifier within the same switch-protocol message is unique among other switch-protocol messages received within a network then it may be likely that the host system that received the switch-protocol message is directly connected to a message-originating switch. On the other hand, if a switch identifier and a port identifier within the same switch-protocol message is identified in other switch-protocol messages within the network then it may be likely that the host systems that received the similar switch-protocol messages are directly connected to the same message-forwarding switch.

In one example, switch-identification module 106 may identify host systems that are connected to a message-originating switch by (1) identifying two or more host systems that received switch-protocol messages with the same switch identifier and (2) determining that the port identifiers contained within the switch-protocol messages are different.

As mentioned above, a message-forwarding switch may simply forward switch-protocol messages unchanged. For this reason in at least one example, switch-identification module 106 may identify host systems connected to message-forwarding switches by (1) identifying two or more host system that received switch-protocol message with the same switch identifier and (2) determining that the port identifiers contained within the switch-protocol messages are identical.

Figure 9:
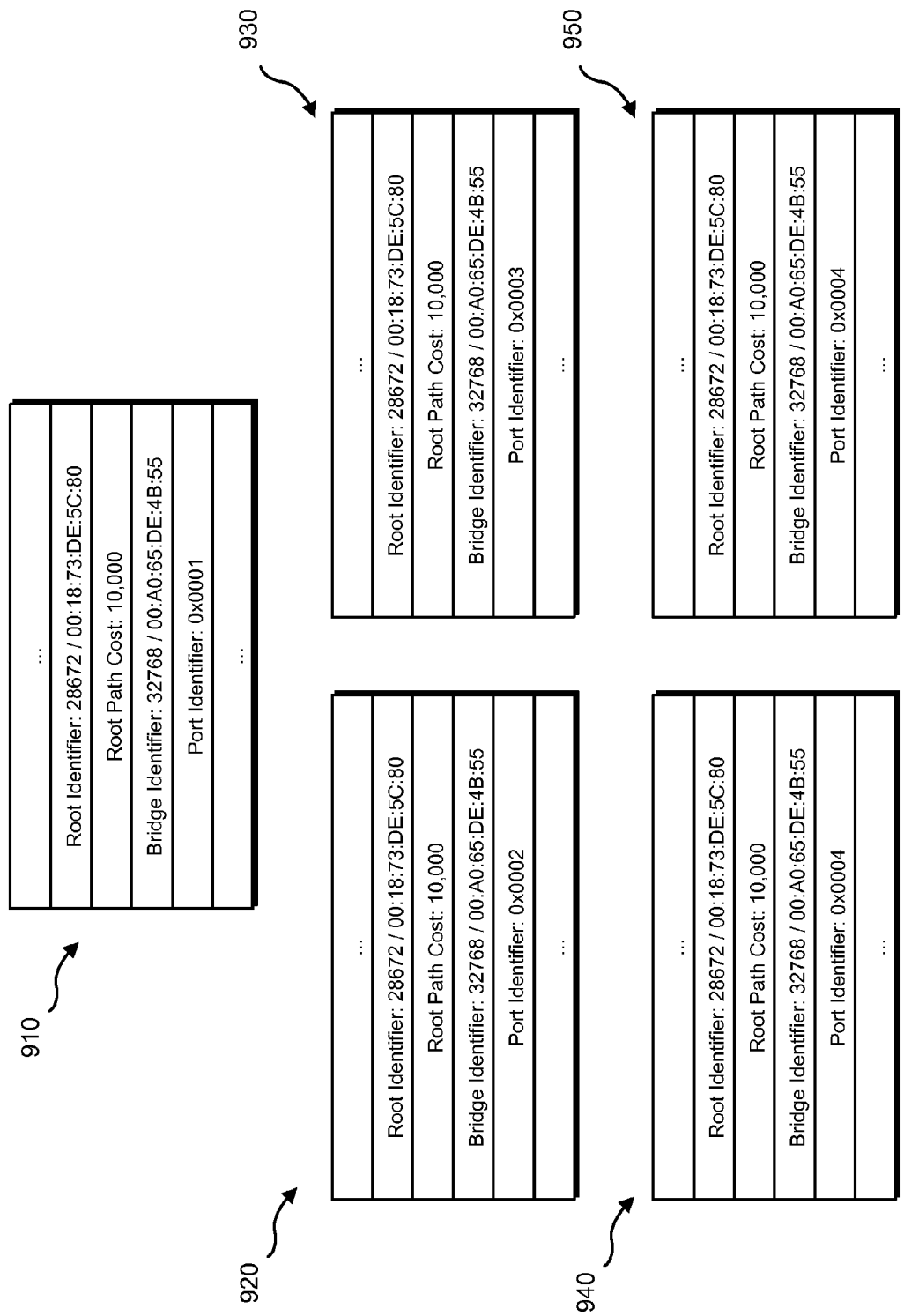
FIG. 9 is a block diagram of exemplary switch-protocol messages.

FIG. 9 is a block diagram of exemplary switch-protocol messages. FIG. 9 illustrates switch-protocol messages that may be broadcast within network 600. Switch-protocol message 910 may represent a switch-protocol message transmitted by managed switch 630 to host 632, switch-protocol message 920 may represent a switch-protocol message transmitted by managed switch 630 to host 634, switch-protocol message 930 may represent a switch-protocol message transmitted by managed switch 630 to host 636, and switch-protocol messages 940 and 950 may represent switch-protocol messages forwarded to hosts 652 and 654 by unmanaged switch 650 after receiving an identical switch-protocol message from managed switch 630.

Using exemplary switch-protocol messages 910, 920, and 930 in FIG. 9 as examples, switch-identification module 106 may determine that hosts 632, 634, and 636 are directly connected to managed switch 630 by (1) determining that the bridge identifiers of switch-protocol messages 910, 920, and 930 identify the same switch (e.g., managed switch 630) and (2) determining that the port identifiers contained within switch-protocol messages 910, 920, and 930 are different (e.g., as shown, 0x0001, 0x0002, and 0x0003).

Switch-identification module 106 may also determine that hosts 652 and 654 are directly connected to unmanaged switch 650 by (1) determining that the bridge identifiers of switch-protocol messages 940 and 950 identify the same switch (e.g., managed switch 630) and (2) determining that the port identifiers contained within switch-protocol messages 940 and 950 are the same (e.g., as shown, 0x0004).

In various examples after identifying a message-originating switch or a message-forwarding switch, switch-identification module 106 may add information about the switch (e.g., a switch identifier of the switch) to switches 126. In at least one example, switch-identification module 106 may also identify each host system directly connected to the switch and store information that associates these host systems with the switch to host systems 124 and/or switches 126. In at least one example, this information may be used to organize host systems by the managed switch to which they are closest.

Figure 10:
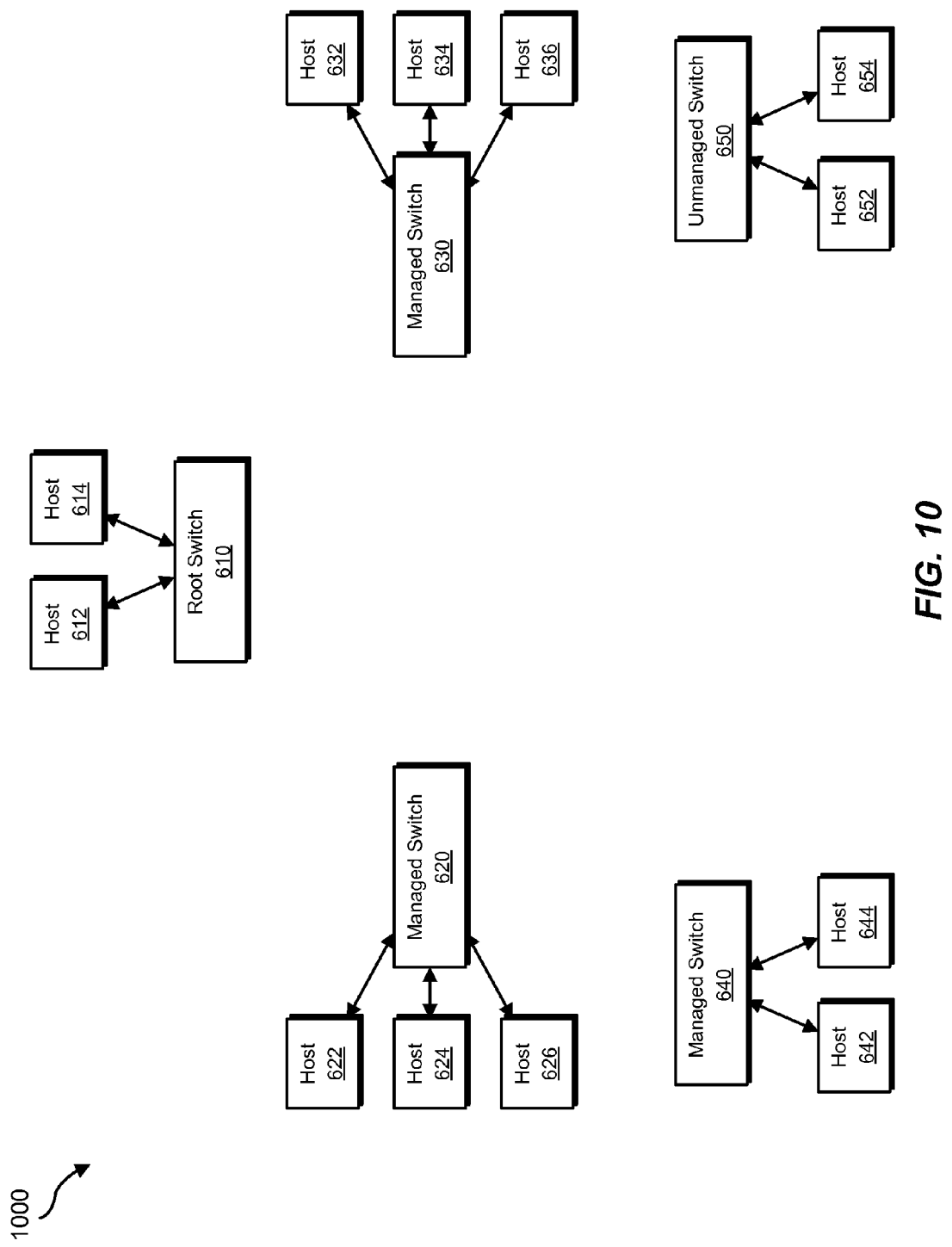
FIG. 10 is a block diagram of an exemplary network map.

FIG. 10 is a block diagram of an exemplary network map 1000 of network 600. FIG. 1000 is an illustration of what the systems described herein may know about network 600 after switch-identification module 106 has identified root switch 610, managed switches 620, 630, and 640, and unmanaged switch 650 and determined that hosts 612 and 614 are directly connected to root switch 610, that hosts 622, 624, and 626 are directly connected to managed switch 620, that hosts 632, 634, and 636 are directly connected to managed switch 630, that hosts 642 and 644 are directly connected to managed switch 640, and that hosts 652 and 654 are directly connected to unmanaged switch 650. Accordingly, network map 1000 may represent a map of the topology of network 600 after switch-identification module 106 has identified the set of switches within network 600.

Returning to FIG. 3 at step 306, one or more of the systems described herein may determine how the set of switches are connected based at least in part on the switch-protocol message. For example, at step 306 connection-determining module 108 may, as part of host systems 202(1)-(N) in FIG. 2, determine how switch 203 and root switch 206 are connected using the switch-protocol messages received as part of step 302.

The systems described herein may perform step 306 in any suitable manner. In one example, connection-determining module 108 may infer how a set of switches within a network are connected by correlating the switch-protocol messages received on the host systems within the network with a unique configuration of the set of switches. For example, connection-determining module 108 may infer the tree structure of network 600 from the switch-protocol messages received on hosts 612, 614, 622, 624, 626, 632, 634, 636, 642, 644, 652, and 654.

Connection-determining module 108 may infer the tree structure of network 600 using switch identifiers, port identifiers, and/or root path costs included within the switch-protocol messages received on hosts 612, 614, 622, 624, 626, 632, 634, 636, 642, 644, 652, and 654. Again using switch-protocol messages 710-750 in FIG. 7 as examples, connection-determining module 108 may first determine that root switch 610 is the root switch of network 600 by identifying the MAC address of root switch 610 in the root identifier fields of switch-protocol messages 710-750.

Upon determining that root switch 610 is the root switch of network 600, connection-determining module 108 may then use the root path costs received within switch-protocol messages 720-740 to determine how managed switches 620, 630, and 640 are connected to root switch 610. For example, if connection-determining module 108 knows the link costs of managed switches 620, 630, and 640, connection-determining module 108 may determine how managed switches 620, 630, and 640 are connected to root switch 610 by determining an aggregate link cost that equals both the root path cost of each of switch-protocol message 720-740 and a sum of the link costs of one or more of managed switches 620, 630, and 640.

For example, if connection-determining module 108 knows that the link costs of managed switches 620, 630, and 640 equal 20,000, 10,000, and 200,000, respectively, connection-determining module 108 may determine that managed switch 620 is directly connected to root switch 610 by determining that the root path cost within switch-protocol message 720 (e.g., 20,000) equals the link cost of managed switch 620 (e.g., 20,000). Similarly, connection-determining module 108 may determine that managed switch 630 is also directly connected to root switch 610 by determining that the root path cost within switch-protocol message 730 (e.g., 10,000) equals the link cost of managed switch 630 (e.g., 10,000).

Connection-determining module 108 may determine that managed switch 640 is indirectly connected to root switch 610 via managed switch 620 by determining that the root path cost within switch-protocol message 740 (e.g., 220,000) equals the sum of the link costs of managed switches 620 and 640 (e.g., 20,000 plus 200,000).

In one example, connection-determining module 108 may further determine that unmanaged switch 650 is indirectly connected to root switch 610 via managed switch 630 by determining that the bridge identifier within switch-protocol message 750 identifies managed switch 630.

Connection-determining module 108 may determine the link cost for each switch within a set of switches by broadcasting, from at least one host system connected to at least one switch within the set of switches, a switch-protocol message that identifies the host system as a new root switch of the network. Connection-determining module 108 may then receive, on at least one additional host system, an additional switch-protocol message that identifies the host system as the root switch and that includes the link cost of the switch.

For example, connection-determining module 108 may broadcast, from at least one host connected to each of root switch 610, managed switch 620, managed switch 630, and managed switch 640, a switch-protocol message that identifies the host as a new root switch of network 600. In response to receiving this switch-protocol message, root switch 610, managed switch 620, managed switch 630, and/or managed switch 640 may create and transmit an additional switch-protocol message that includes the link cost of root switch 610, managed switch 620, managed switch 630, and/or managed switch 640.

By broadcasting a switch-protocol message that identifies a host system as a new root switch, connection-determining module 108 may cause the message-originating switches within a network to generate a new set of switch-protocol messages. This new set of switch-protocol messages may be used to determine link costs of the message-originating switches. For example if two host systems are connected to the same message-originating switch and one of the host systems transmits to the message-originating switch a switch-protocol message that identifies the host system as a new root switch, the other host system may receive an additional switch-protocol message from the message-originating switch that includes a root path cost that is equal to the link cost of the message-originating switch.

In certain examples, this new set of switch-protocol messages may also be used to infer how the set of switches are connected. For example in some instances, connection-determining module 108 may be unable to infer how a set of switches within a network are connected using only the original set of switch-protocol messages received on the host systems within the network (e.g., the original set of switch-protocol messages may imply multiple possible configurations of the network). In these instances, connection-determining module 108 may be able to infer how the set of switches are connected by correlating both the original and new set of switch-protocol messages received on the host systems within the network with a unique configuration of the set of switches.

Figure 11:
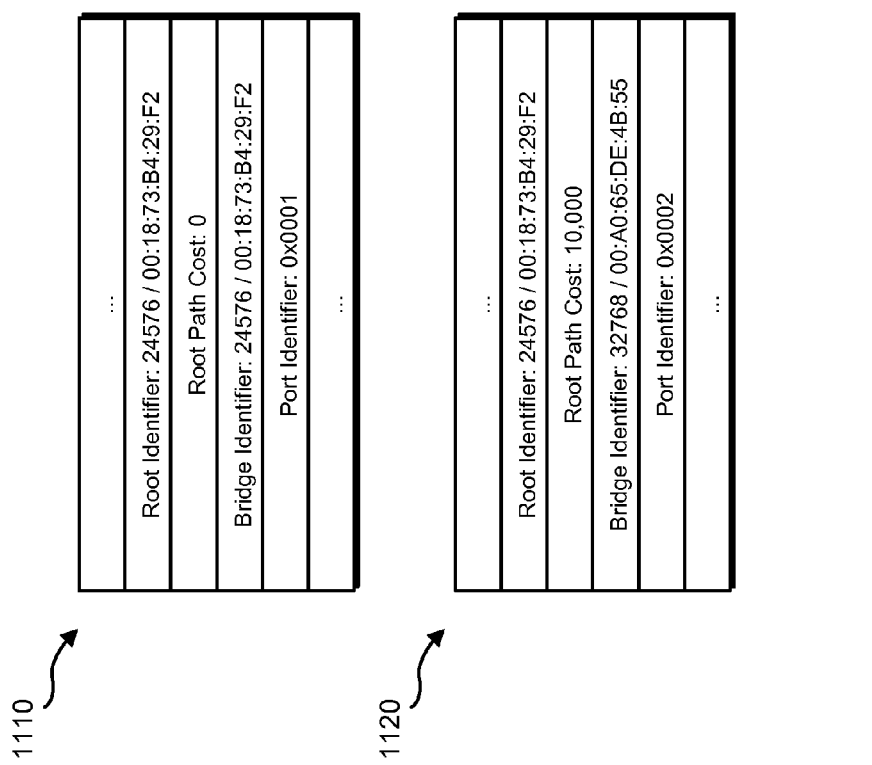
FIG. 11 is a block diagram of exemplary switch-protocol messages.

FIG. 11 is a block diagram of exemplary switch-protocol messages. FIG. 11 illustrates a switch-protocol message 1110 that may represent a switch-protocol message that was broadcast from host 632 to managed switch 630 and a switch-protocol message 1120 that may represent a switch-protocol message that was transmitted by managed switch 630 to one of root switch 610, unmanaged switch 650, host 634, or host 636 in response to receiving switch-protocol message 1110.

Using switch-protocol messages 1110 and 1120 as examples, connection-determining module 108 may, as part of host 632 in FIG. 6, create and transmit switch-protocol message 1110 to managed switch 630 that identifies host 632 as a new root switch of network 600. As shown in FIG. 11, switch-protocol message 1110 may include a root identifier (e.g., 24576/00:18:73:B4:29:F2) that uniquely identifies host 632, a root path cost (e.g., 0) that represents the path cost to host 632, a bridge identifier (e.g., 24576/00:18:73:B4:29:F2) that identifies host 632 as the originator of switch-protocol message 1110, and a port identifier (e.g., 0x0001).

In response to receiving switch-protocol message 1110 from host 632, managed switch 630 may create and transmit via at least one of its other ports a switch-protocol message based on the information contained within switch-protocol message 1110. For example, managed switch 630 may create and transmit switch-protocol message 1120 (e.g., to one of root switch 610, unmanaged switch 650, host 634, or host 636). As shown in FIG. 11, switch-protocol message 1120 may include a root identifier (e.g., 24576/00:18:73:B4:29:F2) that uniquely identifies host 632 as the new root switch of network 600, a root path cost (e.g., 10,000) that represents the path cost from managed switch 630 to host 632 (in this case the link cost of managed switch 630), a bridge identifier (e.g., 32768/00:A0:65:DE:4B:55) that identifies managed switch 630 as the originating switch of switch-protocol message 1120, and a port identifier (e.g., 0x0002) that identifies the port of managed switch 630 through which switch-protocol message 1120 was transmitted.

In one example, connection-determining module 108 may then receive, on host 634, switch-protocol message 1120 that identifies host 632 as the root switch and may determine that the root path cost within switch-protocol message 1120 is the link cost of managed switch 630 based on the fact that host 632 and host 634 are known to be directly connected to managed switch 630.

Figure 12:
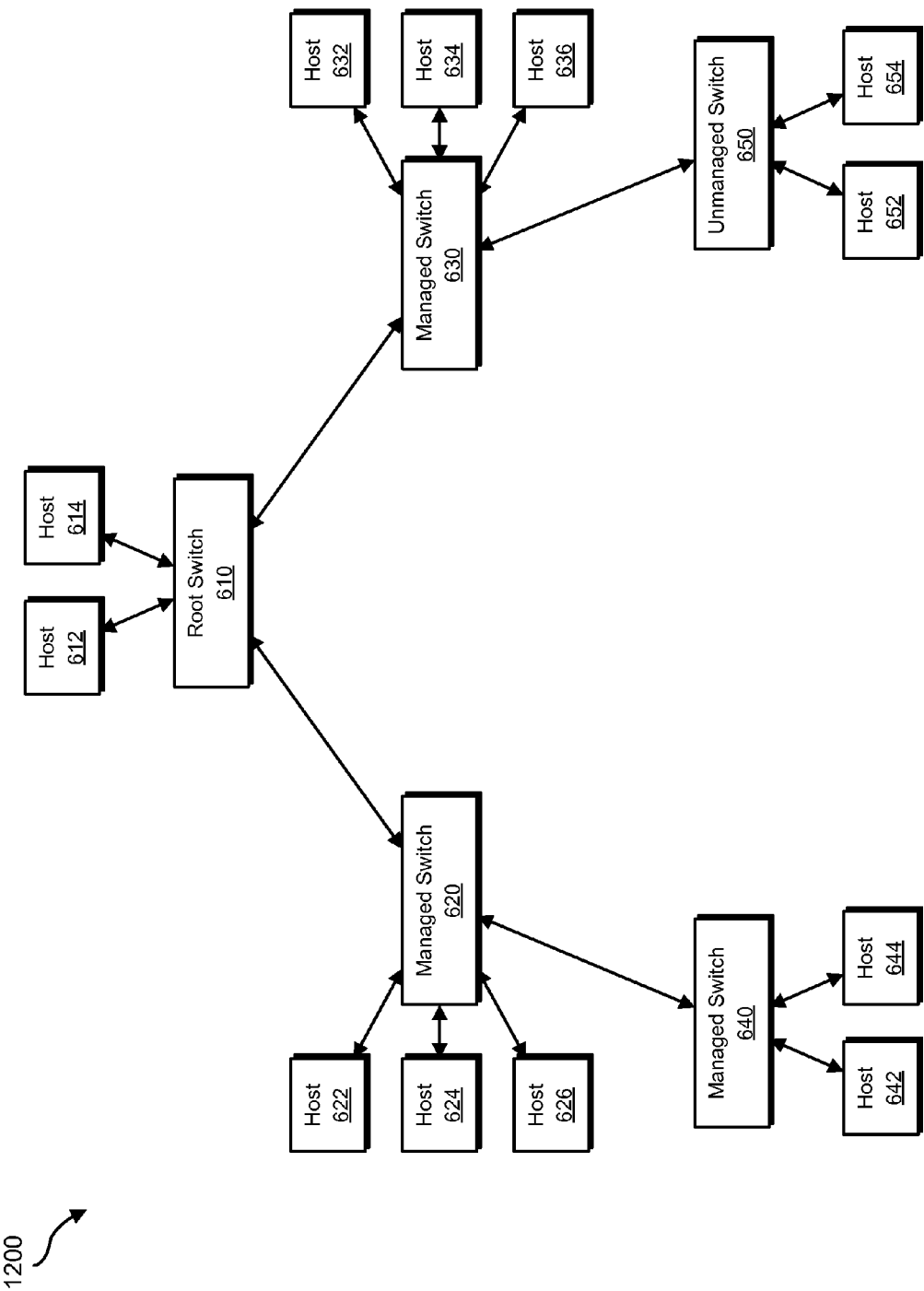
FIG. 12 is a block diagram of an exemplary network map.

FIG. 12 is a block diagram of an exemplary network map 1200 of network 600. FIG. 12 illustrates what the systems described herein may know about network 600 after connection-determining module 108 has determined how root switch 610, managed switches 620, 630, and 640, and unmanaged switch 650 are connected. Accordingly, network map 1200 may represent a map of the topology of network 600 after connection-determining module 108 has determined how the switches within network 600 are connected.

Returning to FIG. 3 at step 308, one or more of the systems described herein may map a topology of the network based at least in part on determining how the set of switches are connected. For example, at step 308 topology-mapping module 110 may, as part of host system 202(1) in FIG. 2, map a topology of network 204 based on determining how switch 203 and root switch 206 are connected.

As used herein, the term "topology" may refer to any information relating to the structure and/or interconnection of one or more host systems and/or one or more switches within a network. In some examples, the term "topology" may refer to a layer-2 topology.

The systems described herein may perform step 308 in any suitable manner. For example, topology-mapping module 110 may map the topology of a network by creating a graph data structure, a relational data structure, and/or any other data structure capable of representing the topology of the network. Generally, topology-mapping module 110 may map the topology of the network by generating any kind of topological information or information isomorphic to topological information. Examples of such information include, without limitation, which host systems are connected to which switches, which switches are interconnected, which host systems share a switch (e.g., which host systems share a message-originating switch and/or which host systems share a message-forwarding switch), the number of switches in the network, how many hosts a switch has, and how many switches are between two given hosts.

In some examples, topology-mapping module 110 may create a complete map of the topology of the network. For example, topology-mapping module 110 may create map 1200 in FIG. 12 of network 600. Additionally or alternatively, topology-mapping module 110 may create only a partial map of a topology of a network. In at least one example, topology-mapping module 110 may create a map of the topology of a network that includes both active and inactive paths within the network. Upon completion of step 308, exemplary method 300 in FIG. 3 may terminate.

As explained above, by correlating switch-protocol messages received on host systems within networks, the systems and methods described herein may discover network topologies. Furthermore, in some examples, by mapping network topologies through the collection of switch-protocol messages that are broadcast by switches within networks, these systems and methods may gather topological information about networks without relying on management protocols or MAC address spoofing. These systems and methods may therefore successfully map networks with unmanaged switches and/or with MAC filtering.

Figure 13:
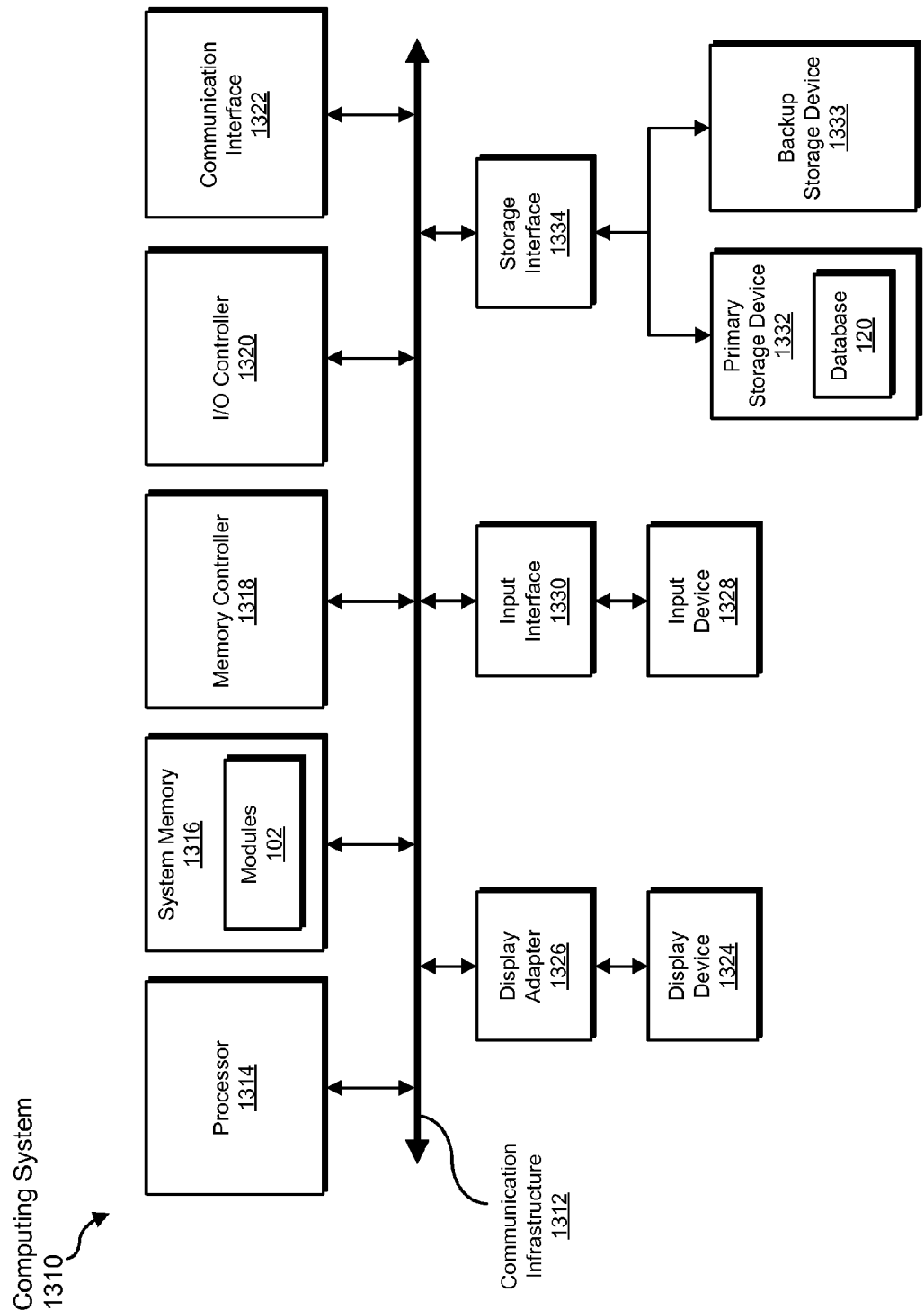
FIG. 13 is a block diagram of an exemplary computing system capable of implementing one or more of the embodiments described and/or illustrated herein.

FIG. 13 is a block diagram of an exemplary computing system 1310 capable of implementing one or more of the embodiments described and/or illustrated herein. For example, all or a portion of computing system 1310 may perform and/or be a means for performing, either alone or in combination with other elements, one or more of the receiving, identifying, determining, mapping, adding, broadcasting, and discovering steps described herein. All or a portion of computing system 1310 may also perform and/or be a means for performing any other steps, methods, or processes described and/or illustrated herein.

Computing system 1310 broadly represents any single or multi-processor computing device or system capable of executing computer-readable instructions. Examples of computing system 1310 include, without limitation, workstations, laptops, client-side terminals, servers, distributed computing systems, handheld devices, or any other computing system or device. In its most basic configuration, computing system 1310 may include at least one processor 1314 and a system memory 1316.

Processor 1314 generally represents any type or form of processing unit capable of processing data or interpreting and executing instructions. In certain embodiments, processor 1314 may receive instructions from a software application or module. These instructions may cause processor 1314 to perform the functions of one or more of the exemplary embodiments described and/or illustrated herein.

System memory 1316 generally represents any type or form of volatile or non-volatile storage device or medium capable of storing data and/or other computer-readable instructions. Examples of system memory 1316 include, without limitation, Random Access Memory (RAM), Read Only Memory (ROM), flash memory, or any other suitable memory device. Although not required, in certain embodiments computing system 1310 may include both a volatile memory unit (such as, for example, system memory 1316) and a non-volatile storage device (such as, for example, primary storage device 1332, as described in detail below). In one example, one or more of modules 102 from FIG. 1 may be loaded into system memory 1316.

In certain embodiments, exemplary computing system 1310 may also include one or more components or elements in addition to processor 1314 and system memory 1316. For example, as illustrated in FIG. 13, computing system 1310 may include a memory controller 1318, an Input/Output (I/O) controller 1320, and a communication interface 1322, each of which may be interconnected via a communication infrastructure 1312. Communication infrastructure 1312 generally represents any type or form of infrastructure capable of facilitating communication between one or more components of a computing device. Examples of communication infrastructure 1312 include, without limitation, a communication bus (such as an Industry Standard Architecture (ISA), Peripheral Component Interconnect (PCI), PCI Express (PCIe), or similar bus) and a network.

Memory controller 1318 generally represents any type or form of device capable of handling memory or data or controlling communication between one or more components of computing system 1310. For example, in certain embodiments memory controller 1318 may control communication between processor 1314, system memory 1316, and I/O controller 1320 via communication infrastructure 1312.

I/O controller 1320 generally represents any type or form of module capable of coordinating and/or controlling the input and output functions of a computing device. For example, in certain embodiments I/O controller 1320 may control or facilitate transfer of data between one or more elements of computing system 1310, such as processor 1314, system memory 1316, communication interface 1322, display adapter 1326, input interface 1330, and storage interface 1334.

Communication interface 1322 broadly represents any type or form of communication device or adapter capable of facilitating communication between exemplary computing system 1310 and one or more additional devices. For example, in certain embodiments communication interface 1322 may facilitate communication between computing system 1310 and a private or public network including additional computing systems. Examples of communication interface 1322 include, without limitation, a wired network interface (such as a network interface card), a wireless network interface (such as a wireless network interface card), a modem, and any other suitable interface. In at least one embodiment, communication interface 1322 may provide a direct connection to a remote server via a direct link to a network, such as the Internet. Communication interface 1322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1322 may also represent a host adapter configured to facilitate communication between computing system 1310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1322 may also allow computing system 1310 to engage in distributed or remote computing. For example, communication interface 1322 may receive instructions from a remote device or send instructions to a remote device for execution.

As illustrated in FIG. 13, computing system 1310 may also include at least one display device 1324 coupled to communication infrastructure 1312 via a display adapter 1326. Display device 1324 generally represents any type or form of device capable of visually displaying information forwarded by display adapter 1326. Similarly, display adapter 1326 generally represents any type or form of device configured to forward graphics, text, and other data from communication infrastructure 1312 (or from a frame buffer, as known in the art) for display on display device 1324.

As illustrated in FIG. 13, exemplary computing system 1310 may also include at least one input device 1328 coupled to communication infrastructure 1312 via an input interface 1330. Input device 1328 generally represents any type or form of input device capable of providing input, either computer or human generated, to exemplary computing system 1310. Examples of input device 1328 include, without limitation, a keyboard, a pointing device, a speech recognition device, or any other input device.

As illustrated in FIG. 13, exemplary computing system 1310 may also include a primary storage device 1332 and a backup storage device 1333 coupled to communication infrastructure 1312 via a storage interface 1334. Storage devices 1332 and 1333 generally represent any type or form of storage device or medium capable of storing data and/or other computer-readable instructions. For example, storage devices 1332 and 1333 may be a magnetic disk drive (e.g., a so-called hard drive), a solid state drive, a floppy disk drive, a magnetic tape drive, an optical disk drive, a flash drive, or the like. Storage interface 1334 generally represents any type or form of interface or device for transferring data between storage devices 1332 and 1333 and other components of computing system 1310. In one example, database 120 from FIG. 1 may be stored in primary storage device 1332.

In certain embodiments, storage devices 1332 and 1333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1332 and 1333 may also include other similar structures or devices for allowing computer software, data, or other computer-readable instructions to be loaded into computing system 1310. For example, storage devices 1332 and 1333 may be configured to read and write software, data, or other computer-readable information. Storage devices 1332 and 1333 may also be a part of computing system 1310 or may be a separate device accessed through other interface systems.

Many other devices or subsystems may be connected to computing system 1310. Conversely, all of the components and devices illustrated in FIG. 13 need not be present to practice the embodiments described and/or illustrated herein. The devices and subsystems referenced above may also be interconnected in different ways from that shown in FIG. 13. Computing system 1310 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1310. All or a portion of the computer program stored on the computer-readable-storage medium may then be stored in system memory 1316 and/or various portions of storage devices 1332 and 1333. When executed by processor 1314, a computer program loaded into computing system 1310 may cause processor 1314 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1310 may be configured as an Application Specific Integrated Circuit (ASIC) adapted to implement one or more of the exemplary embodiments disclosed herein.

Figure 14:
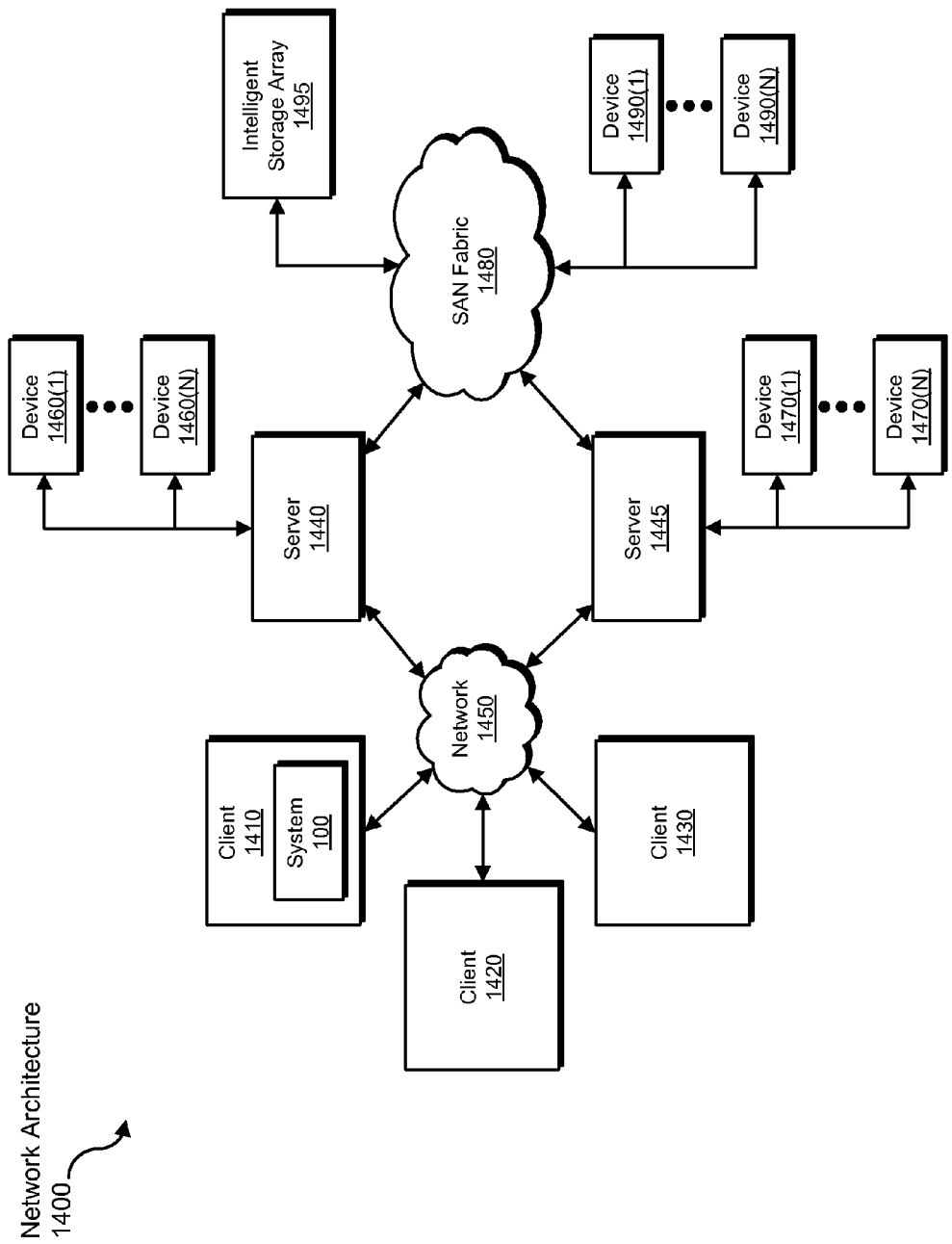
FIG. 14 is a block diagram of an exemplary computing network capable of implementing one or more of the embodiments described and/or illustrated herein.

FIG. 14 is a block diagram of an exemplary network architecture 1400 in which client systems 1410, 1420, and 1430 and servers 1440 and 1445 may be coupled to a network 1450. As detailed above, all or a portion of network architecture 1400 may perform and/or be a means for performing, either alone or in combination with other elements, one or more of the receiving, identifying, determining, mapping, adding, broadcasting, and discovering steps disclosed herein. All or a portion of network architecture 1400 may also be used to perform and/or be a means for performing other steps and features set forth in the instant disclosure.

Client systems 1410, 1420, and 1430 generally represent any type or form of computing device or system, such as exemplary computing system 1310 in FIG. 13. Similarly, servers 1440 and 1445 generally represent computing devices or systems, such as application servers or database servers, configured to provide various database services and/or run certain software applications. Network 1450 generally represents any telecommunication or computer network including, for example, an intranet, a WAN, a LAN, a PAN, or the Internet. In one example, client systems 1410, 1420, and/or 1430 and/or servers 1440 and/or 1445 may include all or a portion of system 100 from FIG. 1.

As illustrated in FIG. 14, one or more storage devices 1460(1)-(N) may be directly attached to server 1440. Similarly, one or more storage devices 1470(1)-(N) may be directly attached to server 1445. Storage devices 1460(1)-(N) and storage devices 1470(1)-(N) generally represent any type or form of storage device or medium capable of storing data and/or other computer-readable instructions. In certain embodiments, storage devices 1460(1)-(N) and storage devices 1470(1)-(N) may represent Network-Attached Storage (NAS) devices configured to communicate with servers 1440 and 1445 using various protocols, such as Network File System (NFS), Server Message Block (SMB), or Common Internet File System (CIFS).

Servers 1440 and 1445 may also be connected to a Storage Area Network (SAN) fabric 1480. SAN fabric 1480 generally represents any type or form of computer network or architecture capable of facilitating communication between a plurality of storage devices. SAN fabric 1480 may facilitate communication between servers 1440 and 1445 and a plurality of storage devices 1490(1)-(N) and/or an intelligent storage array 1495. SAN fabric 1480 may also facilitate, via network 1450 and servers 1440 and 1445, communication between client systems 1410, 1420, and 1430 and storage devices 1490(1)-(N) and/or intelligent storage array 1495 in such a manner that devices 1490(1)-(N) and array 1495 appear as locally attached devices to client systems 1410, 1420, and 1430. As with storage devices 1460(1)-(N) and storage devices 1470(1)-(N), storage devices 1490(1)-(N) and intelligent storage array 1495 generally represent any type or form of storage device or medium capable of storing data and/or other computer-readable instructions.

In certain embodiments, and with reference to exemplary computing system 1310 of FIG. 13, a communication interface, such as communication interface 1322 in FIG. 13, may be used to provide connectivity between each client system 1410, 1420, and 1430 and network 1450. Client systems 1410, 1420, and 1430 may be able to access information on server 1440 or 1445 using, for example, a web browser or other client software. Such software may allow client systems 1410, 1420, and 1430 to access data hosted by server 1440, server 1445, storage devices 1460(1)-(N), storage devices 1470(1)-(N), storage devices 1490(1)-(N), or intelligent storage array 1495. Although FIG. 14 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1440, server 1445, storage devices 1460(1)-(N), storage devices 1470(1)-(N), storage devices 1490(1)-(N), intelligent storage array 1495, or any combination thereof. All or a portion of one or more of the exemplary embodiments disclosed herein may also be encoded as a computer program, stored in server 1440, run by server 1445, and distributed to client systems 1410, 1420, and 1430 over network 1450.

As detailed above, computing system 1310 and/or one or more components of network architecture 1400 may perform and/or be a means for performing, either alone or in combination with other elements, one or more steps of an exemplary method for discovering network topologies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive switch-protocol messages from switches within a network, transform information contained within these switch-protocol messages into an understanding of the switches within the network (e.g., the identities of the switches and/or how the switches are connected), use a result of the transformation to map a topology of the network, and store the mapped network topology to a database configured to store network topologies. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for discovering network topologies, at least a portion of the method being performed by a computing device comprising at least one processor, the method comprising:
   receiving, at each of a plurality of host systems within a network, at least one switch-protocol message that comprises:
      a switch identifier that identifies a switch within the network;
      a port identifier that identifies a port of the switch through which the host system that received the switch-protocol message can communicate with a root switch of the network;
      a root path cost that identifies a path cost from the switch to the root switch;
   gathering, from the plurality of host systems, the switch-protocol messages received at the plurality of host systems;
   using the switch-protocol messages to identify a set of switches within the network;

correlating the switch-protocol messages to determine how the set of switches are connected, wherein correlating the switch-protocol messages to determine how the set of switches are connected comprises identifying a set of intermediate switches between the switch and the root switch based at least in part on the root path cost by:
  identifying a link cost for each switch within the set of switches;
  identifying a subset of the set of switches that comprises the set of intermediate switches by determining that an aggregate link cost of the subset of the set of switches equals, when summed with the link cost of the switch, the root path cost;
mapping a topology of the network based at least in part on how the set of switches are connected.

2. The method of claim 1, wherein using the switch-protocol messages to identify the set of switches within the network comprises:
  identifying at least one additional host system that received an additional switch-protocol message comprising an additional switch identifier that also identifies the switch;
  determining that the host system that received the switch-protocol message and the additional host system are directly connected to a message-originating switch that originated the switch-protocol message and the additional switch-protocol message by determining that the port identifiers of the switch-protocol message and the additional switch-protocol message are different;
  adding the message-originating switch to the set of switches within the network.

3. The method of claim 1, wherein using the switch-protocol messages to identify the set of switches within the network comprises:
  identifying at least one additional host system that received an additional switch-protocol message comprising an additional switch identifier that also identifies the switch;
  determining that the host system that received the switch-protocol message and the additional host system are directly connected to a message-forwarding switch that forwarded the switch-protocol message and the additional switch-protocol message by determining that the port identifiers of the switch-protocol message and the additional switch-protocol message are identical;
  adding the message-forwarding switch to the set of switches within the network.

4. The method of claim 1, wherein identifying the link cost for each switch within the set of switches comprises broadcasting, from at least one of the plurality of host systems, a switch-protocol message that identifies the at least one of the plurality of host systems as a new root switch.

5. The method of claim 4, further comprising receiving, at at least one additional host system within the plurality of host systems, an additional switch-protocol message that identifies the at least one of the plurality of host systems as the new root switch and that comprises the link cost of the switch.

6. The method of claim 1, wherein using the switch-protocol messages to identify the set of switches within the network comprises identifying, for at least one switch within the set of switches, a set of host systems within the plurality of host systems that are directly connected to the switch within the set of switches.

7. The method of claim 1, wherein the steps of gathering, using, correlating, and mapping are performed by one of the plurality of host systems.

8. The method of claim 1, wherein the steps of gathering, using, correlating, and mapping are performed by a server that is separate and distinct from the plurality of host systems.

9. The method of claim 1, wherein the steps of gathering, using, correlating, and mapping are not performed by any switch in the set of switches.

10. A system for discovering network topologies, the system comprising:
  a message-receiving module, stored in memory, that:
    receives, at each of a plurality of host systems within a network, at least one switch-protocol message that comprises:
      a switch identifier that identifies a switch within the network;
      a port identifier that identifies a port of the switch through which the host system that received the switch-protocol message can communicate with a root switch of the network;
      a root path cost that identifies a path cost from the switch to the root switch;
    gathers, from the plurality of host systems, the switch-protocol messages received at the plurality of host systems;
  a switch-identification module, stored in memory, that uses the switch-protocol messages to identify a set of switches within the network;
  a connection-determining module, stored in memory, that correlates the switch-protocol messages to determine how the set of switches are connected, wherein the connection-determining module correlates the switch-protocol messages to determine how the set of switches are connected by identifying a set of intermediate switches between the switch and the root switch based at least in part on the root path cost by:
    identifying a link cost for each switch within the set of switches;
    identifying a subset of the set of switches that comprises the set of intermediate switches by determining that an aggregate link cost of the subset of the set of switches equals, when summed with the link cost of the switch, the root path cost;
  a topology-mapping module, stored in memory, that maps a topology of the network based at least in part on how the set of switches are connected;
  at least one processor configured to execute the message-receiving module, the switch-identification module, the connection-determining module, and the topology-mapping module.

11. The system of claim 10, wherein the switch-identification module uses the switch-protocol messages to identify the set of switches within the network by:
  identifying at least one additional host system that received an additional switch-protocol message comprising an additional switch identifier that also identifies the switch;
  determining that the host system that received the switch-protocol message and the additional host system are directly connected to a message-originating switch that originated the switch-protocol message and the additional switch-protocol message by determining that the port identifiers of the switch-protocol message and the additional switch-protocol message are different;
  adding the message-originating switch to the set of switches within the network.

12. The system of claim 10, wherein the switch-identification module uses the switch-protocol messages to identify the set of switches within the network by:

identifying at least one additional host system that received an additional switch-protocol message comprising an additional switch identifier that also identifies the switch;

determining that the host system that received the switch-protocol message and the additional host system are directly connected to a message-forwarding switch that forwarded the switch-protocol message and the additional switch-protocol message by determining that the port identifiers of the switch-protocol message and the additional switch-protocol message are identical;

adding the message-forwarding switch to the set of switches within the network.

13. The system of claim 10, wherein the connection-determining module is programmed to identify the link cost for each switch within the set of switches by broadcasting, from at least one of the plurality of host systems, a switch-protocol message that identifies the at least one of the plurality of host systems as a new root switch.

14. The system of claim 13, wherein the message-receiving module is programmed to receive, at at least one additional host system within the plurality of host systems, an additional switch-protocol message that identifies the at least one of the plurality of host systems as the new root switch and that comprises the link cost of the switch.

15. The system of claim 10, wherein the switch-protocol message comprises a spanning tree protocol message.

16. A non-transitory computer-readable medium comprising one or more computer-executable instructions that, when executed by at least one processor of a computing device, cause the computing device to:

receive, at each of a plurality of host systems within a network, at least one switch-protocol message that comprises:
 a switch identifier that identifies a switch within the network;
 a port identifier that identifies a port of the switch through which the host system that received the switch-protocol message can communicate with a root switch of the network;
 a root path cost that identifies a path cost from the switch to the root switch;

gather, from the plurality of host systems, the switch-protocol messages received at the plurality of host systems;

use the switch-protocol messages to identify a set of switches within the network;

correlate the switch-protocol messages to determine how the set of switches are connected, wherein correlating the switch-protocol messages to determine how the set of switches are connected comprises identifying a set of intermediate switches between the switch and the root switch based at least in part on the root path cost by:
 identifying a link cost for each switch within the set of switches;
 identifying a subset of the set of switches that comprises the set of intermediate switches by determining that an aggregate link cost of the subset of the set of switches equals, when summed with the link cost of the switch, the root path cost;

map a topology of the network based at least in part on how the set of switches are connected.

* * * * *